United States Patent
Kenter et al.

(10) Patent No.: US 12,046,227 B2
(45) Date of Patent: Jul. 23, 2024

(54) KEY FRAME NETWORKS

(71) Applicant: Google LLC, Mountain View, CA (US)

(72) Inventors: Tom Marius Kenter, London (GB); Tobias Alexander Hawker, London (GB); Robert Clark, Hertfordshire (GB)

(73) Assignee: Google LLC, Mountain View, CA (US)

( * ) Notice: Subject to any disclaimer, the term of this patent is extended or adjusted under 35 U.S.C. 154(b) by 282 days.

(21) Appl. No.: 17/659,840

(22) Filed: Apr. 19, 2022

(65) Prior Publication Data

US 2023/0335110 A1 Oct. 19, 2023

(51) Int. Cl.
*G10L 13/08* (2013.01)
*G10L 15/02* (2006.01)
*G10L 15/06* (2013.01)
*G10L 15/187* (2013.01)

(52) U.S. Cl.
CPC .............. *G10L 13/08* (2013.01); *G10L 15/02* (2013.01); *G10L 15/063* (2013.01); *G10L 15/187* (2013.01); *G10L 2015/025* (2013.01)

(58) Field of Classification Search
CPC ....... G10L 13/08; G10L 15/02; G10L 15/063; G10L 15/187; G10L 2015/025; G10L 13/04

See application file for complete search history.

(56) References Cited

U.S. PATENT DOCUMENTS

2009/0048844 A1* 2/2009 Morinaka ............... G10L 13/07 704/267
2020/0082805 A1* 3/2020 Zhang ................... G10L 13/027

FOREIGN PATENT DOCUMENTS

CN 101710488 A 5/2010
WO 2021118543 A1 6/2021

OTHER PUBLICATIONS

International Search Report and Written Opinion for the related Application No. PCT/US2023/019055 dated Jun. 19, 2023, 75 pages.
Vincent Wan et al: "CHiVE: Varying Prosody in Speech Synthesis with a Linguistically Driven Dynamic Hierarchical Conditional Variational Netwrk", arxiv.org, Cornell University Library, 201 Olin Library Cornell University Ithaca, NY 14853, May 17, 2019 (May 17, 2019), XP081371125, section 3, 10 pages.
Wal-Kim Leung et al., Development of Text-to-Audiovisual, Speech Synthesis to Support Interactive Language Learning on a Mobile Device, <https://www.semanticscholar.org/paper/Development-of-text-to-audiovisual-speech-synthesis-Leung-Yuen/ecaff3f68ab1812d6cca338cccd1a137dc5b872f> , Published Dec. 1, 2013.

(Continued)

*Primary Examiner* — Bhavesh M Mehta
*Assistant Examiner* — Darioush Agahi
(74) *Attorney, Agent, or Firm* — Honigman LLP; Brett A. Krueger; Grant Griffith

(57) ABSTRACT

A method for generating frame values using a key frame network includes receiving a text utterance having at least one phoneme, and for each respective phoneme of the at least one phoneme, predicting, using a predictive model, a fixed quantity of key frames. Each respective key frame of the fixed quantity of key frames includes a representation of a component of the respective phoneme. The method also includes generating, using the fixed quantity of key frames, a plurality of frame values. Here, each respective frame value of the plurality of frame values is representative of a fixed-duration of audio.

20 Claims, 6 Drawing Sheets

(56) References Cited

OTHER PUBLICATIONS

Wesley Mattheyses et al., Comprehensive many-to-many phoneme-to-viseme mapping and its application for concatenative visual speech synthesis, <https://www.researchgate.net/publication/257012000_Comprehensive_many-to-many_phoneme-to-viseme_mapping_and_its_application_for_concatenative_visual_speech_synthesis>, Published Sep. 2013.

* cited by examiner

KEY FRAME NETWORKS

TECHNICAL FIELD

This disclosure relates to a key frame network for predicting frame values.

BACKGROUND

Text-to-speech (TTS) systems read aloud digital text to a user and are becoming increasingly popular on mobile devices. Certain TTS models aim to synthesize various aspects of speech, such as speaking styles, to produce human-like, natural sounding speech. Neural TTS models generally convert input representing text to output intermediate representations of audio such in the form of frames representing fixed-length sections of audio (e.g., 10 ms frames). Because these intermediate representations typically are an order of magnitude or more larger than the amount of input text, neural TTS models require substantial computational resources and time, thereby reducing efficiency during training and inference.

SUMMARY

One aspect of the disclosure provides a method for generating frame values using a key frame network that, when executed data processing hardware, causes the data processing hardware to perform operations. The operations include receiving a text utterance having at least one phoneme and, for each respective phoneme of the at least one phoneme, predicting, using a predictive model, a fixed quantity of key frames. Each respective key frame of the fixed quantity of key frames includes a representation of a component of the respective phoneme. The operations also include generating, using the fixed quantity of key frames, a plurality of frame values. Here, each respective frame value of the plurality of frame values is representative of a fixed-duration of audio.

Implementations of the disclosure may include one or more of the following optional features. In some implementations, a duration of a first key frame of the fixed quantity of key frames is different than a duration of a second key frame of the fixed quantity of key frames. In some examples, the fixed quantity is three. Alternatively, the fixed quantity is ten.

In some implementations, a number of the plurality of frame values per phoneme is variable. Optionally, the audio is representative of synthesized speech. In some examples, generating the plurality of frame values further includes using a deterministic algorithm. In these examples, the deterministic algorithm includes one of an interpolation matrix, a cubic spline interpolation, or a discrete cosine transform.

In some implementations, the operations further include receiving a set of training samples, where each training sample has at least one phoneme, and each phoneme of each training sample has a fixed quantity of ground truth key frames. In these examples, the operations also include training, using the set of training samples, the predictive model to predict the fixed quantity of key frames per phoneme by generating a loss of the predictive model based on the ground truth key frames and minimizing the loss. Here, each respective ground truth key frame of the fixed quantity of ground truth key frames may be annotated with a temporal location of the respective ground truth key frame in the phoneme.

Another aspect of the disclosure provides a system for generating frame values using a key frame network. The system includes data processing hardware and memory hardware in communication with the data processing hardware. The memory hardware stores instructions that when executed on the data processing hardware cause the data processing hardware to perform operations including receiving a text utterance having at least one phoneme and, for each respective phoneme of the at least one phoneme, predicting, using a predictive model, a fixed quantity of key frames. Each respective key frame of the fixed quantity of key frames includes a representation of a component of the respective phoneme. The operations also include generating, using the fixed quantity of key frames, a plurality of frame values. Here, each respective frame value of the plurality of frame values is representative of a fixed-duration of audio.

This aspect may include one or more of the following optional features. In some implementations, a duration of a first key frame of the fixed quantity of key frames is different than a duration of a second key frame of the fixed quantity of key frames. In some examples, the fixed quantity is three. Alternatively, the fixed quantity is ten.

In some implementations, a number of the plurality of frame values per phoneme is variable. Optionally, the audio is representative of synthesized speech. In some examples, generating the plurality of frame values further includes using a deterministic algorithm. In these examples, the deterministic algorithm includes one of an interpolation matrix, a cubic spline interpolation, or a discrete cosine transform.

In some implementations, the operations further include receiving a set of training samples, where each training sample has at least one phoneme, and each phoneme of each training sample has a fixed quantity of ground truth key frames. In these examples, the operations also include training, using the set of training samples, the predictive model to predict the fixed quantity of key frames per phoneme by generating a loss of the predictive model based on the ground truth key frames and minimizing the loss. Here, each respective ground truth key frame of the fixed quantity of ground truth key frames may be annotated with a temporal location of the respective ground truth key frame in the phoneme.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Text-to-speech (TTS) models, often used by speech synthesis systems, are generally given text inputs in the form of phonemes, and generate intermediate audio representations (e.g., frames) for an utterance to be synthesized into speech. Phonemes can vary significantly in duration from a few milliseconds to hundreds of milliseconds. Each of these intermediate audio representations constitutes a short section of audio in the range of 5-20 milliseconds long. Accordingly, the number of intermediate audio representations is typically one to two orders of magnitude larger than the number of phonemes in the text input. Predicting this many intermediate audio representations requires significant time and computing resources for TTS models.

Implementations herein are directed toward a key frame network. In the key frame network, rather than directly predicting all of the intermediate audio representations, the TTS model is trained to predict a fixed quantity of key frames representing a number of intermediate audio representations per phoneme in the text input. That is, instead of predicting frames with a fixed temporal duration, the model may predict a fixed number (e.g., 3, 5, 10, etc.) of key frames per phoneme. The TTS model may expand the fixed quantity of key frames to the intermediate audio representations (e.g., frame values) by interpolation. Advantageously, the step of expanding the fixed quantity of key frames to the intermediate audio representations is deterministic, does not require learned parameters, and takes less time and computation resources than using the TTS model to directly predict the intermediate audio representations from the input text.

During training, the TTS model is trained to predict key frames at the phoneme granularity (i.e., predict a same quantity of key frames per phoneme no matter the temporal length of the phoneme) based on input phonemes. In practice, this results in far fewer predictions per phoneme than traditional TTS models that predict intermediate representations (e.g., frame values that have a fixed temporal duration) per phoneme. Moreover, predicting outputs corresponding to a fixed quantity of key frames per phoneme allows the use of different neural network architectures than those required for predicting outputs of variable length. That is, the neural network architectures employed for predicting fixed quantities of key frames may simpler and have a structure (such as not being auto-regressive, or needing fewer prediction iterations) that is more amenable to efficient computation. During inference, the TTS model is configured to receive a text utterance and predict the key frame values, and then expand the key frames to predict the intermediate representations. This results in significant efficiency improvements for both the time and computational resources to train and operate the TTS model.

Figure 1:
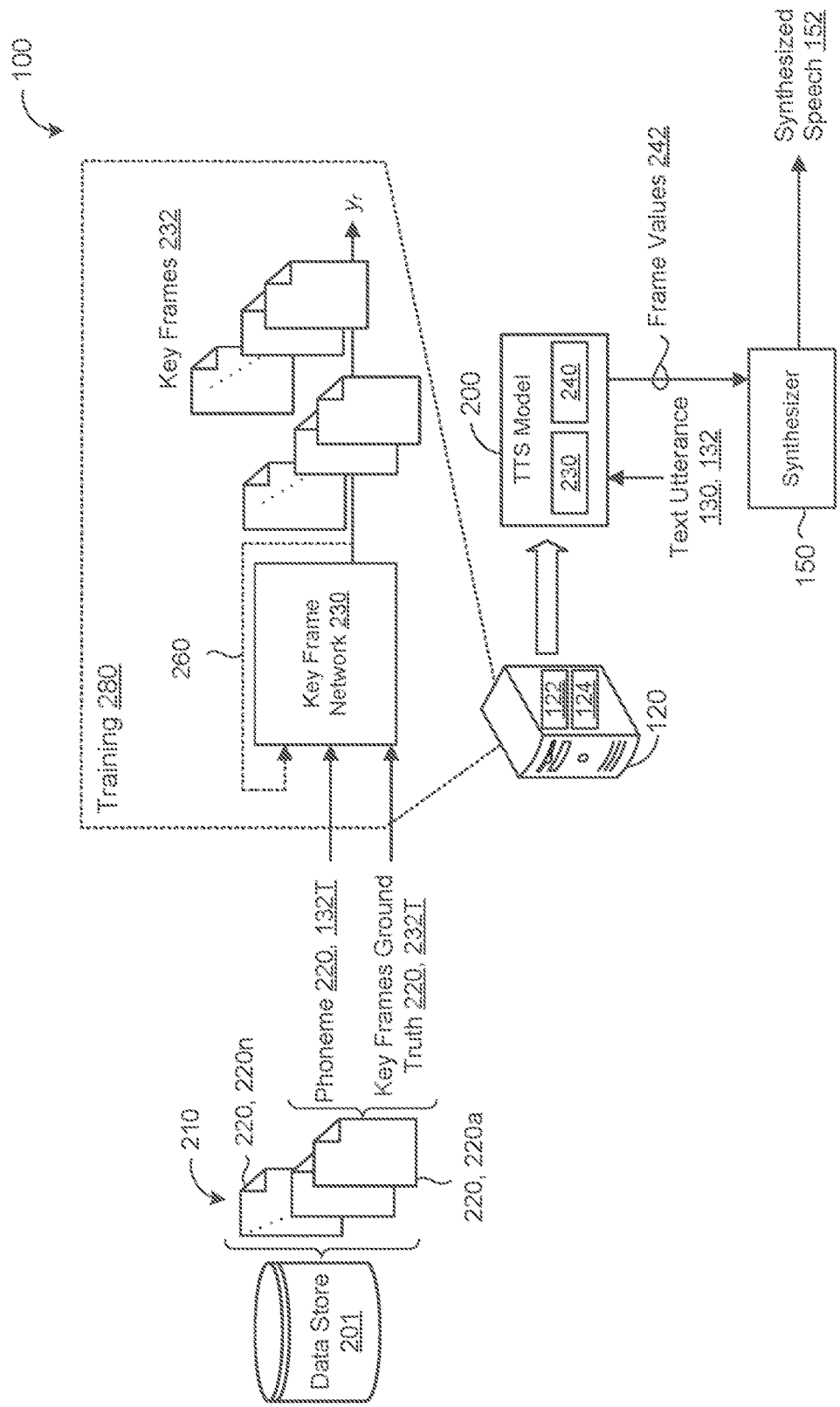
FIG. 1 is an example system for training a deep neural network to provide a key frame network for use in generating frame values from key frames.

Referring now to FIG. 1, in some implementations, an example system 100 includes a text-to-speech (TTS) model 200 for generating synthesized speech 152 from an input text utterance 130. The TTS model 200 executes on a computing system 120 and includes a key frame network 230 that predicts key frames 232 for use by a frame generator 240 to generate frame values 242 representing the text utterance 130. The TTS model 200 may include an autoregressive model or a non-autoregressive model. The computing system 120 includes data processing hardware 122 and memory hardware 124 in communication with the data processing hardware 122 and storing instructions that cause the data processing hardware 122 to perform operations. The computing system 120 may be a single computer, multiple computers, or a distributed system (e.g., a cloud environment) having scalable/elastic resources including computing resources 122 (e.g., data processing hardware) and/or storage resources 124 (e.g., memory hardware). During inference, the TTS model 200 may use the key frame network 230 to predict a fixed quantity of key frames 232 for conversion into frame values 242 by the frame generator 240.

In some implementations, the TTS model 200 receives a text utterance 130 including a sequence of phonemes 132. The text utterance 130 may include one or more feature representations of textual inputs to the TTS model 200. The TTS model 200 receives, as input, the text utterance 130 and for each phoneme 132 of the at least one phoneme 132. Using the text utterance 130, the TTS model 200 generates/predicts, using the key frame network 230, a fixed quantity of key frames 232. In other words, the key frame network 230 predicts a fixed quantity of key frames 232 for each phoneme 132 in the text utterance 130 (i.e., the same quantity of key frames 232 for each phoneme 132). The fixed quantity of key frames together may represent a variable number of frame values corresponding to the respective phoneme 132, and may additionally include an end of a previous phoneme 132 in the sequence or a start of a subsequent next phoneme 132 in the sequence. Here, each respective key frame 232 of the fixed quantity of key frames 232 includes a representation of a component of the respective phoneme 132. As described in greater detail below, each key frame 232 may represent any number of frame values 242 for each phoneme 132, where the fixed quantity of key frames 232 are distributed uniformly across its respective phoneme 132. As used herein, the term "component" of each respective phoneme 132 may include a portion of the respective phoneme 132, a portion of the previous phoneme 132, and/or a portion of a next phoneme 132, as well as IDCT-coefficients. Because each phoneme 132 may include a different fixed-duration of audio (i.e., some phonemes take longer to speak than others), the plurality of frame values 242 per phoneme 132 is variable, while the quantity of key frames 232 per phoneme remains fixed.

Once the key frame network 230 predicts the fixed quantity of key frames 232 for some or all of the phonemes 132, a frame generator 240 receives the key frames 232 and, using the key frames 232, generates a plurality of frame values 242. Each respective frame value 242 in the plurality of frame values 242 represents a fixed-duration of audio. That is, each of the frame values 242 represents a short section of audio of the same duration (e.g., 5-20 milliseconds) and includes acoustic features such as Mel-frequency spectrograms, source-filter vocoder parameters, or pitch and energy values. In some implementations, the computing system 120 (e.g., the data processing hardware 122) executing the TTS model 200 provides the frame values 242 predicted by the TTS model 200 from the input text utterance 130 to a synthesizer 150 for conversion into a time-domain audio waveform indicative of synthesized speech 152 that may be audibly output as a spoken representation of the input text utterance 130. A time-domain audio waveform includes an audio waveform that defines an amplitude of an audio signal over time. The synthesizer 150 may be separately trained and conditioned on mel-frequency spectrograms or source-filter vocoder parameters for conversion into time-domain audio waveforms. The type of audio features the synthesizer is conditioned and trained upon is non-limiting.

In some implementations, the key frame network 230 is trained on a large training data set 210 of training samples 220, 220a-n. Each training sample 220 may include at least one training phoneme 132T (e.g., feature representations of textual inputs) paired with a fixed quantity of ground truth key frames 232T. During training, the key frame network 230 may receive multiple training examples 220, 220a-n, where the training examples 220 include training phonemes 132T of variable-length in the time-domain (i.e., of varying durations). The key frame network 230 is configured to encode the representation (e.g., feature representations of textual utterances) associated with each training phoneme 132T in the training example 220 into a corresponding prediction including a fixed quantity of key frames 232 representing a quantity of frame values 242.

Figure 2:
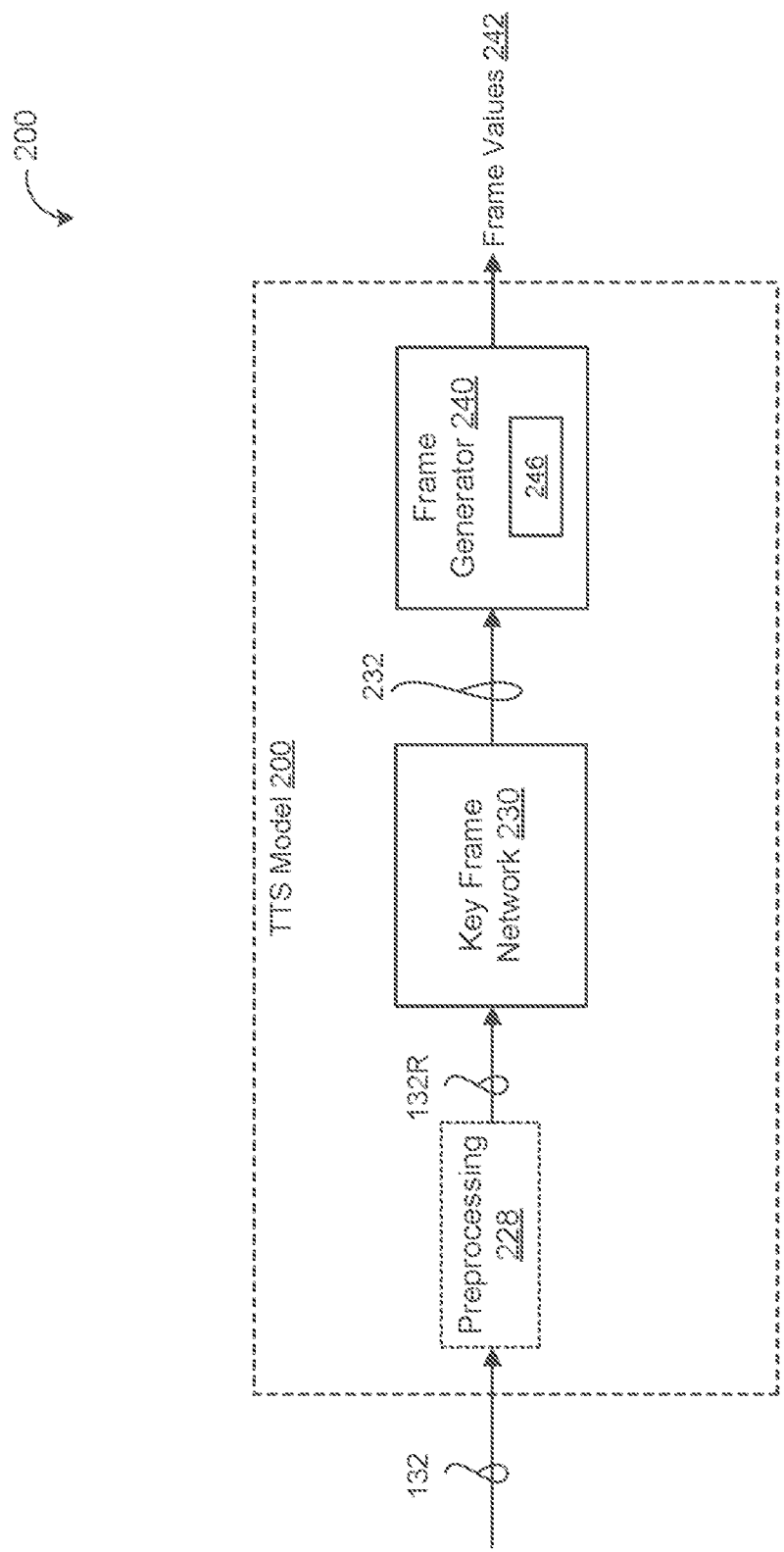
FIG. 2 is a schematic view of example components of the key frame network of FIG. 1.

Referring now to FIG. 2, the TTS model 200 may include a preprocessing module 228 configured to receive, as input, the phonemes 132 corresponding to the received text utterance 130 and convert the phonemes 132 to audio feature representations 132R for input to the key frame network 230. The key frame network 230 generates the fixed quantity of key frames 232 for each phoneme 132 using the text feature representations 132R. The fixed quantity of key frames 232 may be any number, for example, the quantity may be three key frames 232 representing three components/portions of each respective phoneme 132. As another example, the quantity may include ten key frames 232 representing ten components/portions of each respective phoneme 132. However, these quantities are exemplary and the key frame network 230 may be trained to predict any fixed quantity of key frames 232 depending upon the specific use case of the ITS model 200 and the hardware capabilities of the computing system 120 executing the TTS model 200.

In some implementations, the frame generator 240 of the TTS model 200 executes a deterministic, and computationally cheap, algorithm 246 that receives, as input, the fixed quantity of key frames 232 from the key frame network 230 and generates/predicts, using the deterministic algorithm 246, the plurality of frame values 242, each representative of a fixed-duration section of audio. In some examples, the deterministic algorithm 246 includes an interpolation process based on an interpolation matrix. However, the deterministic algorithm 246 can include other deterministic approaches such as, and without limitation, cubic spline interpolation, discrete cosine transform, or linear interpolation. Advantageously, because the deterministic algorithm 246 is a deterministic process, the frame generator 240 does not include learned parameters, and hence, does not require training allowing for computationally inexpensive implementations (e.g., no training time or resources required). For example, both discrete cosine transform and linear interpolation may be implemented by constructing appropriate interpolation matrices, wherein the interpolation may be performed as a multiplication using the corresponding matrix.

Figure 3A:
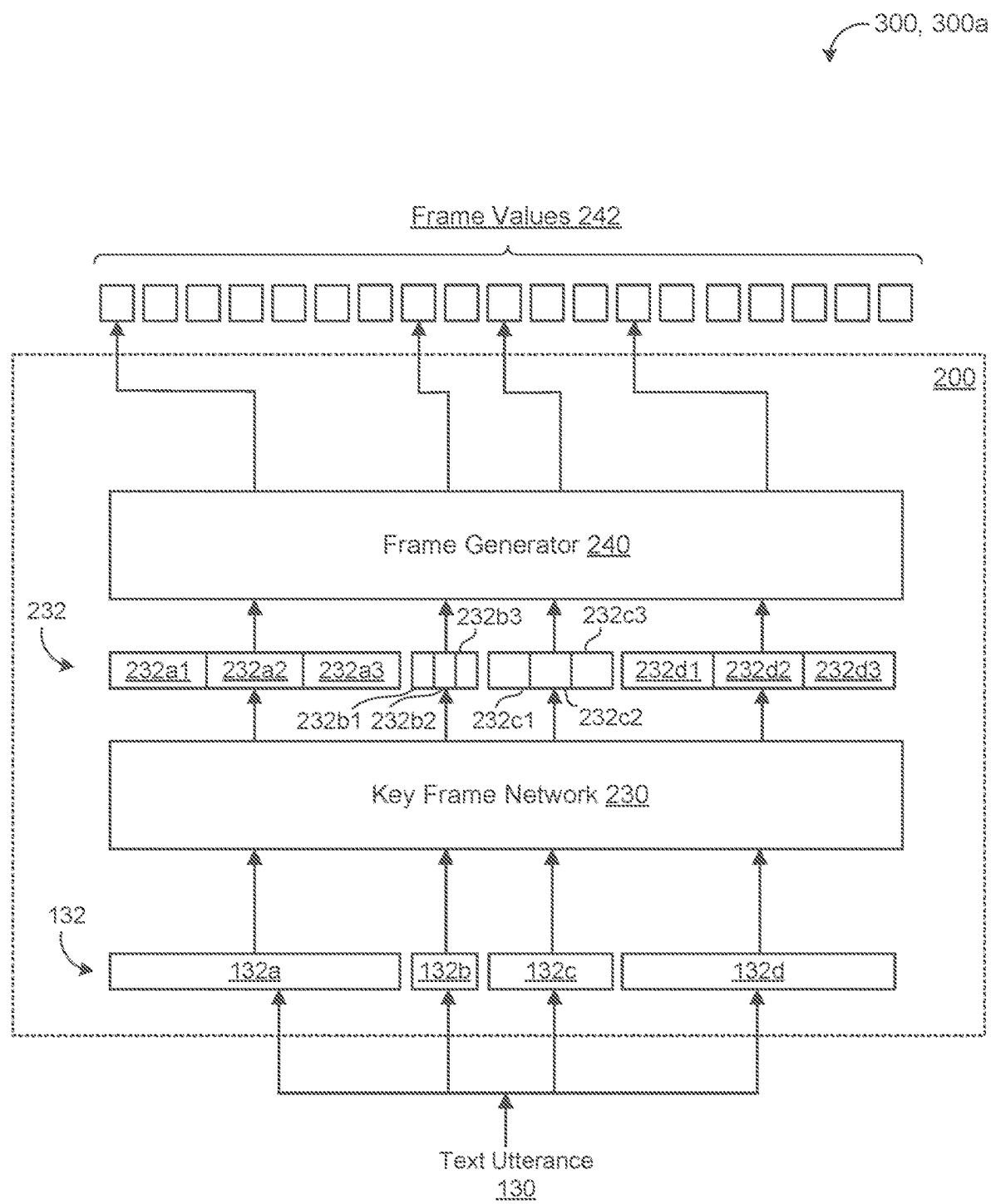
FIG. 3A is a schematic view of an example system for generating frame values.

Referring now to FIG. 3A, a schematic view 300a illustrates a sequence of phonemes 132 for a received text utterance 130 converted to frame values 242 using the TTS model 200. For illustrative purposes only, the text utterance 130 includes a sequence of four phonemes 132a-d. As shown, each of the phonemes 132 requires a different duration of time when spoken. In some languages, phonemes 132 can vary significantly in duration (e.g., a few milliseconds to hundreds of milliseconds). Here, the phonemes have a duration represented by a length of their outline, and accordingly, the phonemes 132a, 132d have a relatively longer duration than the phonemes 132b, 132c The key frame network 230 receives the phonemes 132a-d and generates, for each phoneme 132a-d, a fixed quantity of key frames 232a1-d3. In the example shown, the fixed quantity of frame values 242 predicted by the key frame network 230 is three. Specifically, the key frame network 230 predicts three key frames 232a1-3 as representations of the phoneme 132a, three key frames 232b1-b3 as representations for the phoneme 132b, three key frames 232c1-c3 as representations for the phoneme 132c, and three key frames 232d1-d3 as representations for the phoneme 132d. Because the phonemes 132a-d each require different durations (i.e., require different amount of time when spoken out loud), the fixed quantity of key frames 232 for each of the phonemes 132a-d may be different. For example, while the durations of each of 232c1-c3 are the same, the number of frames in key frame 232ci is less than the number of frames in key frame 232d2. Conversely, the number of frames in key frame 232c1 is greater than the number of frames in key frame 232b1.

The frame generator 240 generates, using the twelve key frames 232a1-d3 generated by the key frame network 230, a plurality of frame values 242, where each respective frame value 242 represents a fixed-duration of audio. As shown, the key frames 232a-d are expanded to a different number of frame values 242 for each phoneme 132a-d. Accordingly, a number of the plurality of frame values 242 is larger than both the number of phonemes 132a-d and the key frames 232a-d. For example, when the duration of each frame value is 10 ms and the duration of each of the key frames 232a1-d3 summed is 400 ms, the frame generator 240 generates 40 frames values 242 (i.e., 400 divided by 10).

Figure 3B:
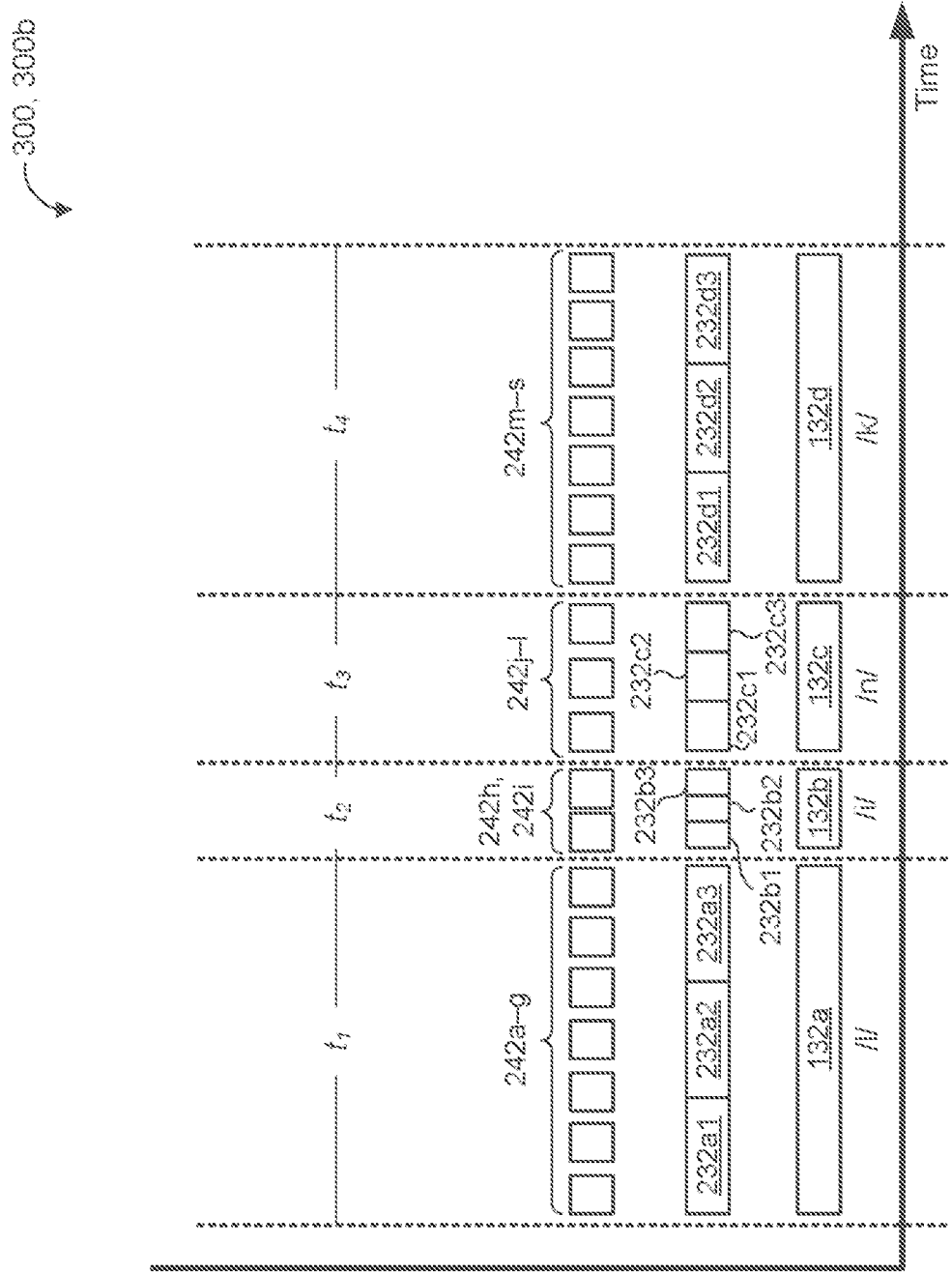
FIG. 3B is a schematic view of a time plot including phonemes, key frames, and frame values.

Referring to FIG. 3B, schematic view 300b shows the sequence phonemes 132 in 3B set on an x-axis representing a duration of time. Here, the text utterance 130 corresponds to the word "link," which includes the phoneme /l/ 132a, the phoneme /i/ 132b, the phoneme /n/ 132c, and the phoneme /k/ 132d. As described previously, while each phoneme 132a-d may be represented by a different duration of audio, such as the durations $t_{1-4}$ illustrated in FIG. 3B, each phoneme 132a-d is represented by the same number of key frames 132 per phoneme 132 (i.e., three in this example). For example, the phoneme /l/ 132a is represented by the three key frames 232a1-a3, which includes three key frames equally distributed across the time 1i. The three key frames 232a1-a3 are converted (e.g., interpolated) to seven frame values 242a-g, and may also expand across phoneme boundaries as discussed in greater detail below. That is, here, the three key frames 232a1-a3 are converted to the seven frame values 242a-g distributed across the time $t_1$. Similarly, the phoneme /i/ 132b corresponds to three key frames 232b1-b3, however the three key frames 232b1-b3 are converted to two frame values 142 in the plurality of frame values 142b distributed across the time 12. The phoneme /n/ 132c corresponds to three key frames 232c1-c3 and the three key frames 232c1-c3 are converted to three frame values 242j-l distributed across the time $t_3$. Finally, the phoneme /k/ 132d corresponds to the three key frames 232d1-d3, and the three key frames 232c1-c3 are converted to seven frame values 242m-s distributed across the time 14.

In some implementations, the frame generator 240 generates the frame values 242 from the key frames 232 of each phoneme 132 individually. That is, the frame generator 240 generates a number of frame values 242 from a first set of key frames 232 representing a phoneme 132 and then generates another number of frame values 242 from a second set of key frames 232 represent another phoneme 132 (and so on). In other implementations, the frame generator 240 generates the frame values 242 using all of the key frames 232 for multiple phonemes 132 in these implementations, some frame values 242 may represent a component of a first key frame 232 and a component of a second key frame 232. That is, the interpolation generating the frame values 242 may cross the boundaries of key frames 232 and/or phonemes 132.

Referring again to FIG. 1, a training process 280 for training the key frame network 230 to generate the fixed number of key frames 232 per phoneme 132 is shown. The training process 280 executes on the computing system 120. As shown, the training process 280 obtains one or more training data sets 210 stored in a data store 201 and trains the key frame network 230 (e.g., a deep neural network) on the training data sets 210. The data store 201 may reside on the memory hardware 124 of the computing system 120. Each training data set 210 includes a plurality of training examples 220, 220a-n, where each training example 220 may include at least one training phoneme 132T paired with a fixed quantity of ground truth key frames 232T. Simply put, the training process 280 trains the key frame network 230 to learn to predict the fixed quantity of ground truth key frames 232T (e.g, three ground truth key frames 232T) for each training phoneme 132T.

In some implementations, each of the training examples 220 are associated with a temporal location of the respective ground truth key frame 232T in the corresponding training phoneme 132T, so that the key frame network 230 learns, through the training process 280, to generate a fixed quantity of key frames 232 at corresponding times in response to receiving a phoneme 132 as input. In the example shown, the key frame network 230 receives the training example 220 as input and generates an output prediction $y_r$. The output prediction $y_r$ includes a predicted fixed quantity of key frames 232, which are tested for accuracy. During the training process 280 and at each time-step, or a batch of time-steps, the key frame network 230 may be trained to minimize loss using a loss function 260 based on the output prediction $y_r$ and the fixed quantity of ground truth key frames 232T of the corresponding training example 220 serving as ground truth.

Figure 4:
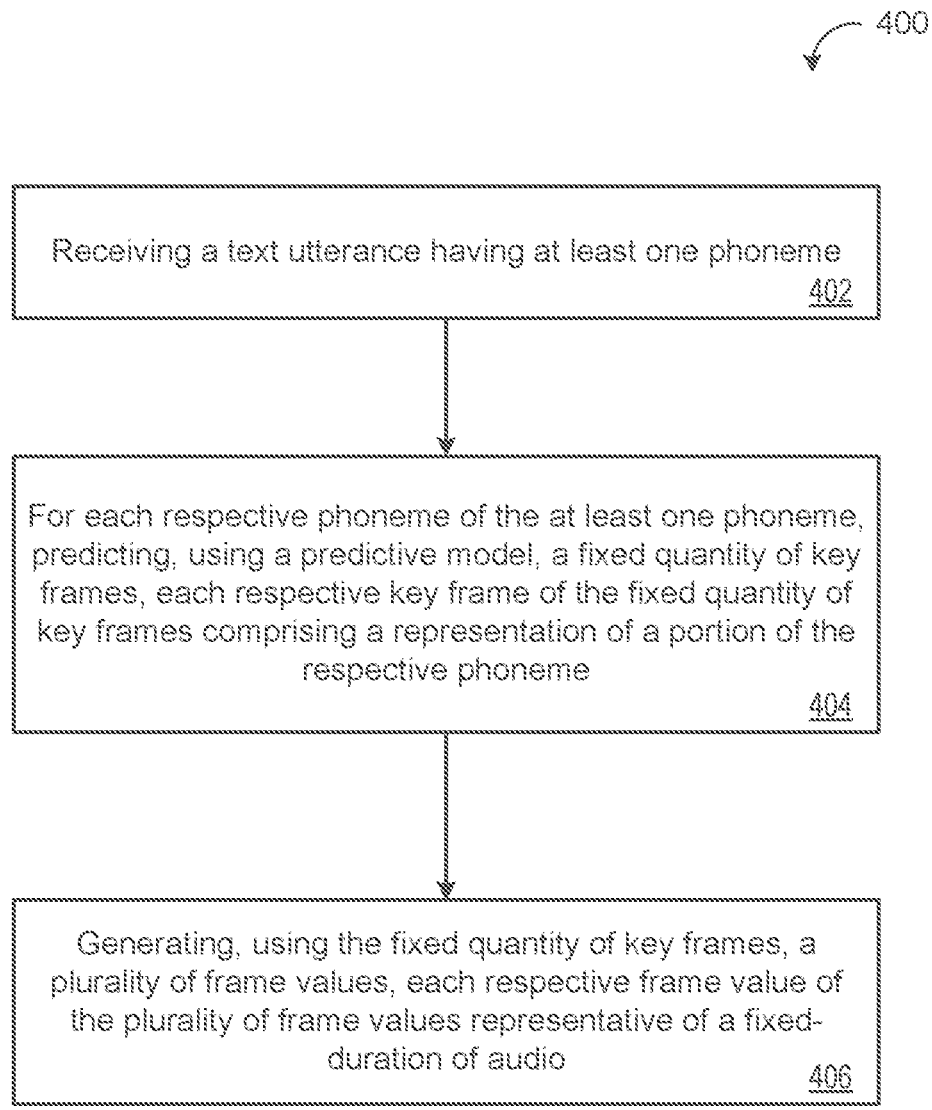
FIG. 4 is a flowchart of an example arrangement of operations for a method of generating frame values using the key frame network.

FIG. 4 is a flowchart of an exemplary arrangement of operations for a method 400 of generating frame values 242 using a key frame network 230. The method 400 includes, at operation 402, receiving a text utterance 130 having at least one phoneme 132. For each respective phoneme 132 of the at least one phoneme 132, the method 400 also includes, at operation 404, predicting, using a predictive model 230 (i.e., a key frame network 230), a fixed quantity of key frames 232. Each respective key frame 232 of the fixed quantity of key frames 232 includes a representation of a component of the respective phoneme 132. At operation 406, the method 400 further includes generating, using the fixed quantity of key frames 232, a plurality of frame values 242. Here, each respective frame value 242 of the plurality of frame values 242 is representative of a fixed-duration of audio.

Figure 5:
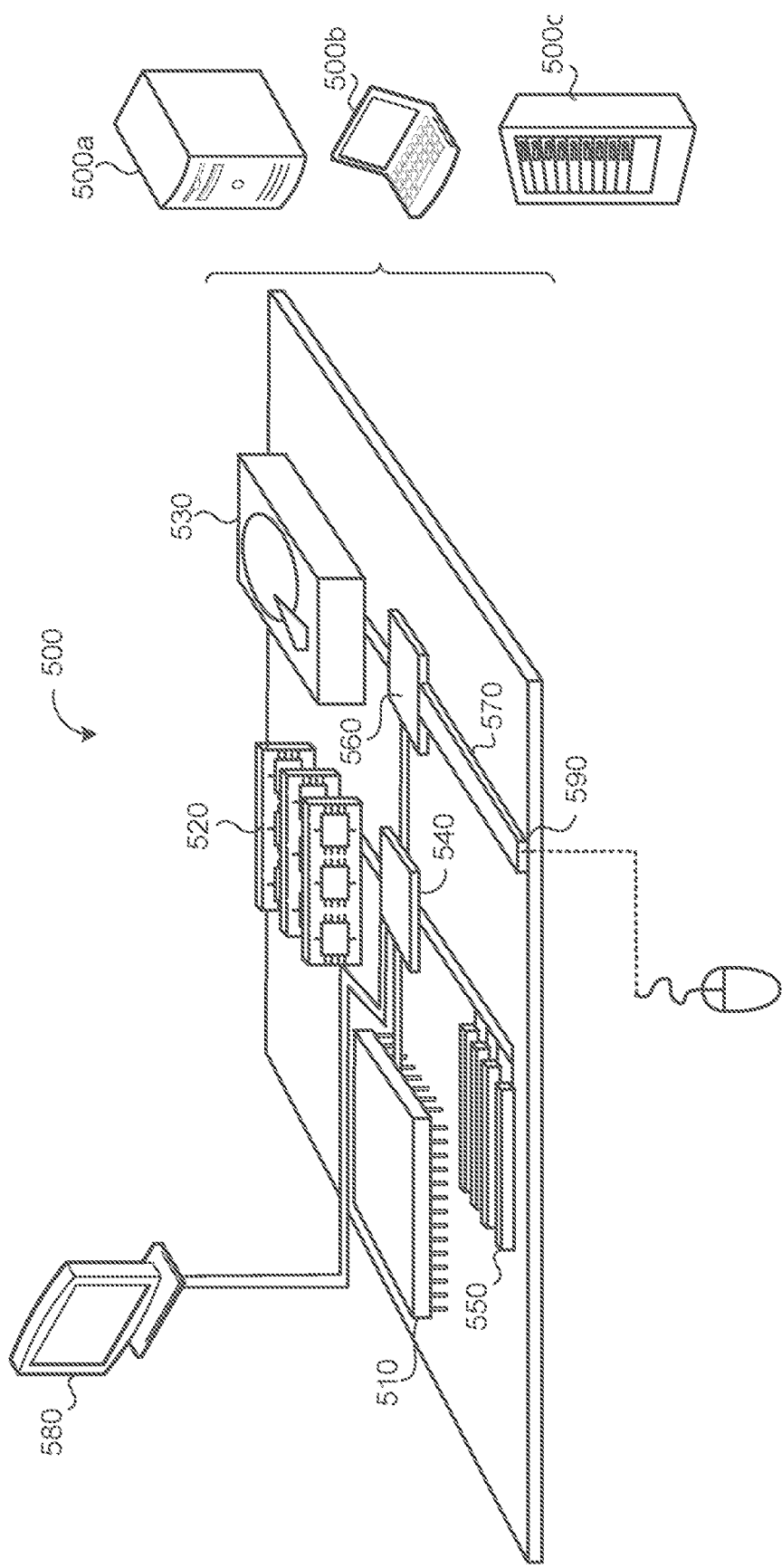
FIG. 5 is a schematic view of an example computing device that may be used to implement the systems and methods described herein.

FIG. 5 is a schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 (e.g., data processing hardware 122 of FIG. 1) can process instructions for execution within the computing device 500, including instructions stored in the memory 520 or on the storage device 530 to display graphical information for a graphical user interface (GUI) on an external input/output device, such as display 580 coupled to high speed interface 540 in other implementations, multiple processors and/or multiple buses may be used, as appropriate, along with multiple memories and types of memory. Also, multiple computing devices 500 may be connected, with each device providing components of the necessary operations (e.g., as a server bank, a group of blade servers, or a multi-processor system).

The memory 520 (e.g, memory hardware of FIG. J) stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices, magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback, and input from the user can be received in any form, including acoustic, speech, or tactile input. In addition, a computer can interact with a user by sending documents to and receiving documents from a device that is used by the user, for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed on data processing hardware causes the data processing hardware to perform operations comprising
receiving a text utterance having at least one phoneme;
for each respective phoneme of the at least one phoneme, predicting, using a predictive model, a fixed quantity of key frames, each respective key frame of the fixed quantity of key frames comprising a representation of a component of the respective phoneme; and
generating, using the fixed quantity of key frames, a plurality of frame values, each respective frame value of the plurality of frame values representative of a fixed-duration of audio.

2. The computer-implemented method of claim 1, wherein each respective key frame further comprises at least one of a representation of a portion of a previous phoneme in the text utterance or a representation of a portion of a subsequent next phoneme in the text utterance.

3. The computer-implemented method of claim 1, wherein the fixed quantity is three.

4. The computer-implemented method of claim 1, wherein the fixed quantity is ten.

5. The computer-implemented method of claim 1, wherein a number of the plurality of frame values per phoneme is variable.

6. The computer-implemented method of claim 1, wherein the audio is representative of synthesized speech.

7. The computer-implemented method of claim 1, wherein generating the plurality the plurality of frame values further comprises using a deterministic algorithm.

8. The computer-implemented method of claim 7, wherein the deterministic algorithm comprises an interpolation process based on one of:
- an interpolation matrix;
- a cubic spline interpolation; or
- a discrete cosine transform.

9. The computer-implemented method of claim 1, wherein the operations further comprise:
- receiving a set of training samples, each training sample having at least one phoneme, each phoneme of each training sample having a fixed quantity of ground truth key frames, and
- training, using the set of training samples, the predictive model to predict the fixed quantity of key frames per phoneme by:
  - generating a loss of the predictive model based on the ground truth key frames; and
  - minimizing the loss.

10. The computer-implemented method of claim 9, wherein each respective ground truth key frame of the fixed quantity of ground truth key frames is annotated with a temporal location of the respective ground truth key frame in the phoneme.

11. A system comprising:
- data processing hardware; and
- memory hardware in communication with the data processing hardware, the memory hardware storing instructions that when executed on the data processing hardware cause the data processing hardware to perform operations comprising:
  - receiving a text utterance having at least one phoneme,
  - for each respective phoneme of the at least one phoneme, predicting, using a predictive model, a fixed quantity of key frames, each respective key frame of the fixed quantity of key frames comprising a representation of a component of the respective phoneme, and
  - generating, using the fixed quantity of key frames, a plurality of frame values, each respective frame value of the plurality of frame values representative of a fixed-duration of audio.

12. The system of claim 1, wherein each respective key frame further comprises at least one of a representation of a portion of a previous phoneme in the text utterance or a representation of a portion of a subsequent next phoneme in the text utterance.

13. The system of claim 11, wherein the fixed quantity is three.

14. The system of claim 11, wherein the fixed quantity is ten.

15. The system of claim 11, wherein a number of the plurality of frame values per phoneme is variable.

16. The system of claim 11, wherein the audio is representative of synthesized speech.

17. The system of claim 11, wherein generating the plurality the plurality of frame values further comprises using a deterministic algorithm.

18. The system of claim 17, wherein the deterministic algorithm comprises an interpolation process based on one of:
- an interpolation matrix;
- a cubic spline interpolation; or
- a discrete cosine transform.

19. The system of claim 11, wherein the operations further comprise:
- receiving a set of training samples, each training sample having at least one phoneme, each phoneme of each training sample having a fixed quantity of ground truth key frames, and
- training, using the set of training samples, the predictive model to predict the fixed quantity of key frames per phoneme by:
  - generating a loss of the predictive model based on the ground truth key frames; and
  - minimizing the loss.

20. The system of claim 19, wherein each respective ground truth key frame of the fixed quantity of ground truth key frames is annotated with a temporal location of the respective ground truth key frame in the phoneme.

* * * * *